(12) United States Patent
Choi et al.

(10) Patent No.: US 9,882,193 B2
(45) Date of Patent: Jan. 30, 2018

(54) SECONDARY BATTERY AND METHOD FOR FABRICATING THE SAME

(71) Applicant: LG CHEM, LTD., Seoul (KR)

(72) Inventors: Mi-Geum Choi, Daejeon (KR); Hang-June Choi, Daejeon (KR); Jeong-O Mun, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/301,535

(22) PCT Filed: May 12, 2016

(86) PCT No.: PCT/KR2016/005022
§ 371 (c)(1),
(2) Date: Oct. 3, 2016

(87) PCT Pub. No.: WO2016/204410
PCT Pub. Date: Dec. 22, 2016

(65) Prior Publication Data
US 2017/0040635 A1 Feb. 9, 2017

(30) Foreign Application Priority Data

Jun. 16, 2015 (KR) .................. 10-2015-0085428

(51) Int. Cl.
*H01M 2/26* (2006.01)
*H01M 10/058* (2010.01)
(Continued)

(52) U.S. Cl.
CPC ............. *H01M 2/26* (2013.01); *B23K 20/129* (2013.01); *B23K 35/0255* (2013.01);
(Continued)

(58) Field of Classification Search
CPC ............ H01M 2/26; H01M 2/20; H01M 2/10; H01M 2/30; H01M 2/305; H01M 2/22;
(Continued)

(56) References Cited

U.S. PATENT DOCUMENTS 6,387,567 B1 5/2002 Noh
2002/0146620 A1* 10/2002 Connell ................ H01M 2/266
429/161

(Continued)

FOREIGN PATENT DOCUMENTS

JP 2004-39274 A 2/2004
JP 2000-311713 A 11/2007
(Continued)

*Primary Examiner* — Laura Weiner
(74) *Attorney, Agent, or Firm* — Birch, Stewart, Kolasch & Birch, LLP (57) ABSTRACT

Provided is a pouch-type secondary battery which can increase spatial utility by reducing the length of a non-electrode region and a method for fabricating the same. The secondary battery according to the present disclosure is a secondary battery having a sealed structure such that an electrode assembly of positive electrode plate/separator/negative electrode plate is embedded in a pouch case and an electrode tab of the electrode assembly is joined to an electrode lead and juts outside, wherein the electrode tab is welded to a side surface perpendicular to a surface-wise direction of the secondary battery on the electrode lead arranged parallel to the surface-wise direction of the secondary battery, to form a welded part in a thickness-wise direction of the electrode lead between the electrode lead and the electrode tab.

16 Claims, 10 Drawing Sheets

(51) Int. Cl.
    *B23K 20/12*     (2006.01)
    *H01M 2/02*     (2006.01)
    *H01M 2/30*     (2006.01)
    *H01M 10/04*     (2006.01)
    *H01M 10/0525*     (2010.01)
    *H01M 10/0583*     (2010.01)
    *H01M 10/0585*     (2010.01)
    *H01M 10/0587*     (2010.01)
    *B23K 35/28*     (2006.01)
    *B23K 35/30*     (2006.01)
    *B23K 35/02*     (2006.01)
    *B23K 35/22*     (2006.01)
    *B23K 35/24*     (2006.01)
    *B23K 101/38*     (2006.01)

(52) U.S. Cl.
CPC ........ *B23K 35/0261* (2013.01); *B23K 35/222* (2013.01); *B23K 35/24* (2013.01); *B23K 35/286* (2013.01); *B23K 35/302* (2013.01); *B23K 35/3006* (2013.01); *B23K 35/3033* (2013.01); *B23K 35/3053* (2013.01); *H01M 2/0237* (2013.01); *H01M 2/305* (2013.01); *H01M 10/0413* (2013.01); *H01M 10/058* (2013.01); *H01M 10/0525* (2013.01); *H01M 10/0583* (2013.01); *H01M 10/0585* (2013.01); *H01M 10/0587* (2013.01); *B23K 2201/38* (2013.01); *H01M 2220/20* (2013.01)

(58) Field of Classification Search
CPC ........ H01M 2/263; H01M 2/266; H01M 2/08; H01M 10/043; H01M 10/0413; H01M 10/0583; H01M 10/0585; H01M 10/0587; H01M 10/0525; H01M 10/04; H01M 10/058; H01M 10/0431; B23K 26/21; B23K 2201/38
See application file for complete search history.

(56) References Cited

U.S. PATENT DOCUMENTS

| | | | |
|---|---|---|---|
| 2011/0129718 A1* | 6/2011 | Lee | ........................ H01M 10/02 429/153 |
| 2011/0206976 A1* | 8/2011 | Yoo | ..................... H01M 2/1061 429/153 |
| 2011/0311859 A1 | 12/2011 | Park | |
| 2012/0082891 A1 | 4/2012 | Ahn | |

FOREIGN PATENT DOCUMENTS

| | | |
|---|---|---|
| KR | 10-2003-0066172 A | 8/2003 |
| KR | 10-2011-0095819 A | 8/2011 |
| KR | 10-2011-0137639 A | 12/2011 |
| KR | 10-2012-0034567 A | 4/2012 |
| KR | 10-2012-0051163 A | 5/2012 |
| KR | 10-2012-0062254 A | 6/2012 |
| KR | 10-2013-0050616 A | 5/2013 |
| KR | 10-2013-0067714 A | 6/2013 |
| KR | 10-2014-0110136 A | 9/2014 |
| KR | 10-2015-0000547 A | 1/2015 |

* cited by examiner

SECONDARY BATTERY AND METHOD FOR FABRICATING THE SAME

TECHNICAL FIELD

The present disclosure relates to a secondary battery and a method for fabricating the same, and more particularly, to a pouch-type secondary battery that can increase the internal spatial utility of the battery by improving a joined part of an electrode tab and an electrode lead in the pouch-type secondary battery and a method for fabricating the same.

The present application claims priority to Korean Patent Application No. 10-2015-0085428 filed in the Republic of Korea on Jun. 16, 2015, the disclosure of which is incorporated herein by reference.

BACKGROUND ART

Due to its characteristics of being easily applicable to various products and electrical properties such as a high energy density, a secondary battery is not only commonly applied to a portable device, but universally applied to an electric vehicle (EV) or a hybrid electric vehicle (HEV) that runs on an electric driving source. This secondary battery is gaining attention for its primary advantage of remarkably reducing the use of fossil fuels and not generating by-products from the use of energy, making it a new eco-friendly and energy efficient source of energy.

Secondary batteries can be classified into various types of batteries including can-type batteries with internal elements in a metallic hard case, according to the shape or structure for applications, and with the recent trend toward miniaturization of mobile devices, the demand for thin prismatic and pouch-type batteries is growing. Particularly, high attention is paid to a pouch-type secondary battery which is easy to adapt the shape, has a low production cost, and is lightweight. In addition, development and commercialization of a pouch-type secondary battery as a power source of electric vehicle or hybrid electric vehicle requiring high output and large capacity is in progress.

Figure 1:
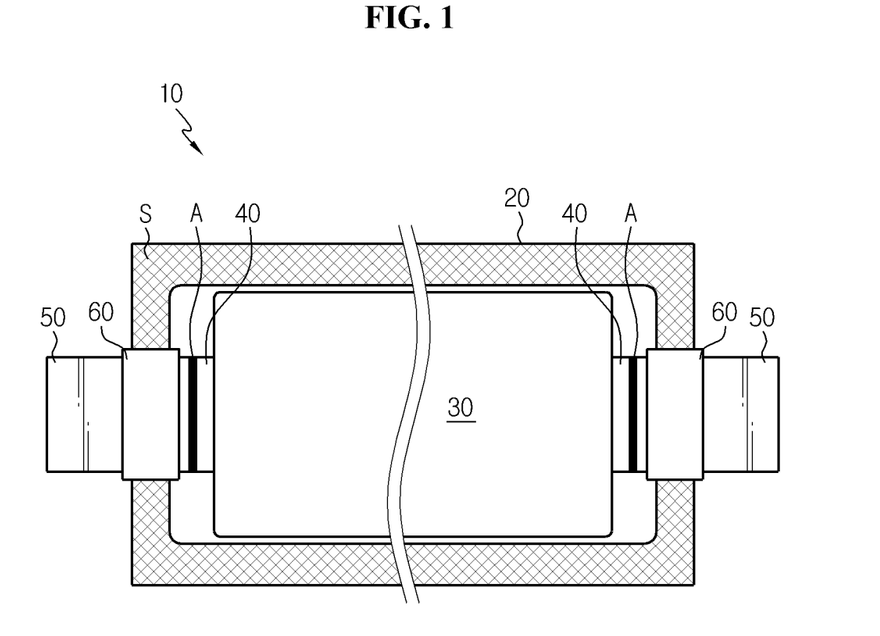
FIG. 1 is a plane projection view of a conventional pouch-type secondary battery.
Figure 2:
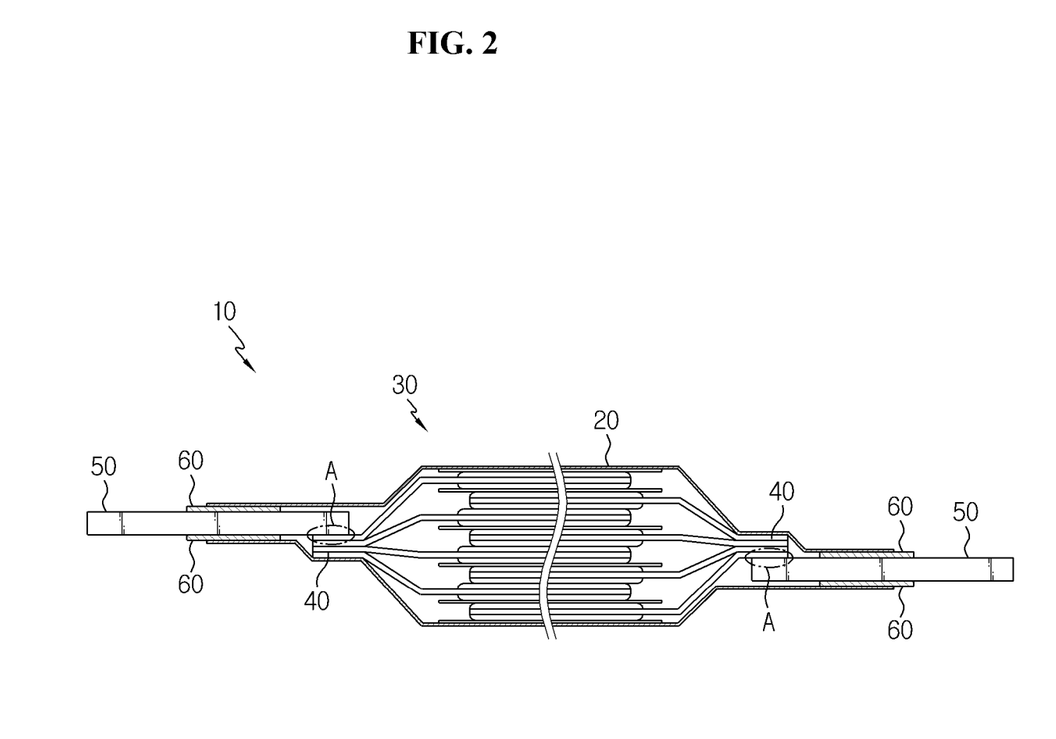
FIG. 2 is a cross-sectional view of the pouch-type secondary battery shown in FIG. 1.

FIG. 1 is a plane projection view of a conventional pouch-type secondary battery, and FIG. 2 is a cross-sectional view of the pouch-type secondary battery.

Referring to FIGS. 1 and 2, the pouch-type secondary battery 10 includes a pouch case 20, an electrode assembly 30, an electrode tab 40, an electrode lead 50 and a lead film 60.

The pouch-type secondary battery 10 has a structure in which the electrode assembly 30 is received in the pouch case 20. The electrode assembly 30 received in the pouch case 20 refers to an alternating stack of a positive electrode plate and a negative electrode plate. In this instance, a separator is interposed between the positive electrode plate and the negative electrode plate to separate them. The electrode tab 40 extends from or is connected to the electrode plate for each polarity. The electrode lead 50 is connected to the electrode tab 40. The lead film 60 is for sealability and insulation of the electrode lead 50 and the pouch case 20, and is interposed between the electrode lead 50 and the inner surface of the pouch case 20. Reference symbol S indicates a sealing part by heat fusion.

The conventional pouch-type secondary battery 10 with this structure has a welded part A in the length-wise direction (or surface-wise direction) of the electrode lead 50 by joining a lower surface or an upper surface of the electrode tab 40 to an upper surface or a lower surface of the electrode lead 50 using ultrasonic welding. For this reason, the conventional pouch-type secondary battery 10 needs to have an ample space within the pouch case 20 for surface-wise direction coupling between the electrode tab 40 and the electrode lead 50.

For example, in the conventional pouch-type secondary battery 10, the welded part A is about 4 mm in width, and a non-electrode region (terrace) between the electrode assembly 30 and the pouch case 20 is about 18 mm in consideration of the width of the surface-wise direction welded part A and the sealing part S. Thus, the conventional pouch-type secondary battery 10 has a problem with the internal space utility of the secondary battery due to the presence of the surface-wise direction welded part space.

DISCLOSURE

Technical Problem

The present disclosure is designed to solve the problem of conventional art, and therefore, the present disclosure is directed to providing a pouch-type secondary battery which can increase spatial utility by reducing the length of a non-electrode region and a method for fabricating the same.

Technical Solution

To achieve the object, a secondary battery according to the present disclosure is a secondary battery having a sealed structure such that an electrode assembly of positive electrode plate/separator/negative electrode plate is embedded in a pouch case and an electrode tab of the electrode assembly is joined to an electrode lead and juts outside, wherein the electrode tab is welded to a side surface perpendicular to a surface-wise direction of the secondary battery on the electrode lead arranged parallel to the surface-wise direction of the secondary battery, to form a welded part in a thickness-wise direction of the electrode lead between the electrode lead and the electrode tab.

The welded part may be formed by welding one end of the electrode tab to the side surface of the electrode lead.

The electrode tab may be multiple in number, the multiple electrode tabs may be joined together to the side surface of the electrode lead by welding to form the welded part, and a thickness of the electrode lead may be thicker than the sum of thicknesses of the multiple electrode tabs.

One end part of the electrode tab may be bent 180 degrees and folded in dual layers to increase the thickness, and a bent part may be welded to the side surface of the electrode lead to form the welded part. In this instance, the electrode tab may be multiple in number and the multiple electrode tabs may be bent together. Alternatively, the electrode tabs may be individually bent.

The welded part may have a width in a length-wise direction of the electrode lead that is less than or equal to 1 mm.

A method for fabricating a secondary battery according to the present disclosure, the secondary battery having a sealed structure such that an electrode assembly of positive electrode plate/separator/negative electrode plate is embedded in a pouch case and an electrode tab of the electrode assembly is joined to an electrode lead and juts outside, includes welding the electrode tab to a side surface perpendicular to a surface-wise direction of the secondary battery on the electrode lead arranged parallel to the surface-wise direction of the secondary battery, to form a welded part in a thickness-wise direction of the electrode lead between the electrode lead and the electrode tab.

The welding may be performed by friction stir welding.

A method for fabricating a secondary battery according to the present disclosure includes preparing an electrode assembly having an electrode plate to which an electrode tab is connected, bending one end part of the electrode tab once or more to increase a thickness, and joining a bent part of the electrode tab to a side surface of an electrode lead by friction stir welding.

Here, a thickness of the electrode lead is preferably thicker than an overall thickness of the electrode tab.

Advantageous Effects

The present disclosure may have a welding width of less than 1 mm in the surface-wise direction through a welding structure in the thickness-wise direction, as compared to conventional surface-wise direction welding of 4 mm width. As the welding width reduces, a non-electrode region called a terrace reduces, and the electrode assembly can increase in size. Accordingly, capacity maximization can be achieved through the non-electrode region reduction.

Further, when the electrode lead and the electrode tab increase in thickness as compared to conventional art for thickness-wise direction welding, the cooling performance is improved.

BRIEF DESCRIPTION OF THE DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawings.

BEST MODE FOR CARRYING OUT THE INVENTION

Hereinafter, preferred embodiments of the present disclosure will be described in detail with reference to the accompanying drawings. However, the present disclosure is not limited to the embodiments disclosed below, and will be embodied in a variety of different forms, and this embodiment is only provided for complete disclosure of the present disclosure and to help those skilled in the art understand the scope of the invention fully and completely. The drawings and the embodiments are not intended to limit the present disclosure to a disclosed particular form, and rather, the present disclosure covers all modifications, equivalents and substituents falling within the spirit of the present disclosure defined by the claims. The shape of elements in the drawings is exaggerated for clarity, and like reference numerals indicate like elements.

Figure 3:
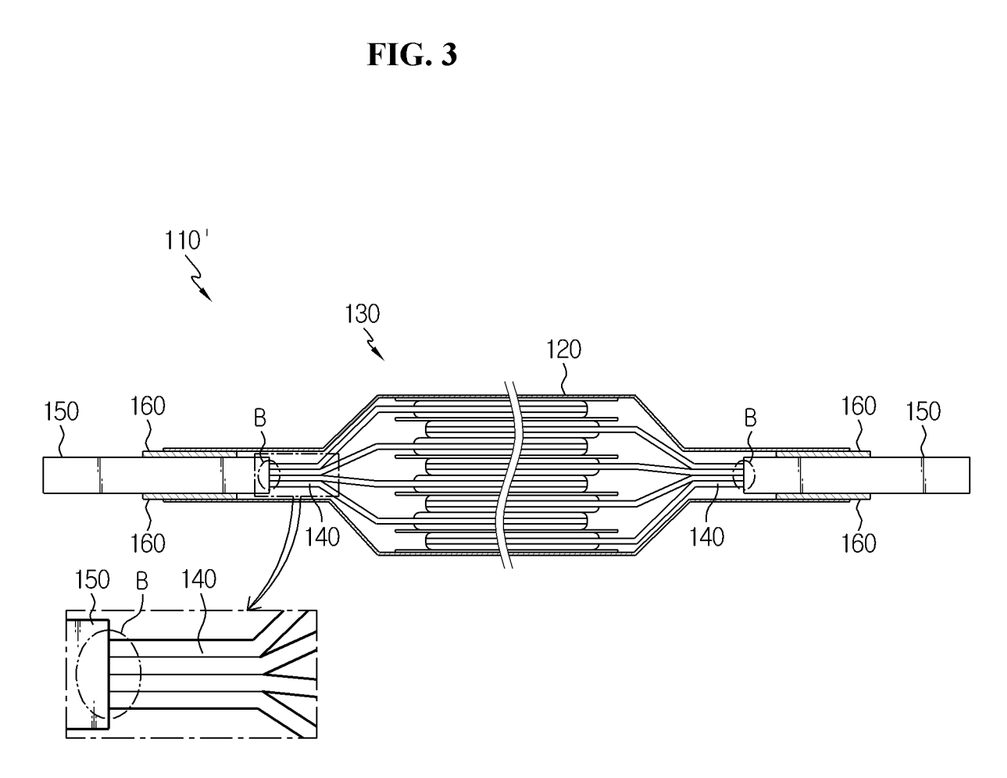
FIG. 3 is a cross-sectional view of a pouch-type secondary battery according to an embodiment of the present disclosure.

FIG. 3 is a cross-sectional view of a pouch-type secondary battery according to an embodiment of the present disclosure.

Referring to FIG. 3, the secondary battery 110 according to an embodiment of the present disclosure is a secondary battery having a sealed structure such that an electrode assembly 130 of positive electrode plate/separator/negative electrode plate is embedded in a pouch case 120 and an electrode tab 140 of the electrode assembly 130 is joined to an electrode lead 150 and juts outside. Also, the electrode tab 140 is welded to the side surface perpendicular to the surface-wise direction of the secondary battery 110 on the electrode lead 150 arranged parallel to the surface-wise direction of the secondary battery 110, to form a welded part B in the thickness-wise direction of the electrode lead 150 between the electrode lead 150 and the electrode tab 140. The secondary battery 110 is mounted in a cartridge, stacked, and assembled into a module or a pack.

The electrode assembly 130 is constructed such that at least one positive electrode plate and at least one negative electrode plate are arranged with a separator interposed therebetween, and are received in the pouch case 120. In this instance, the electrode assembly 130 may be received in the pouch case 120 in such a manner that a plurality of positive electrode plates and a plurality of negative electrode plates are stacked, or one positive electrode plate and one negative electrode plate are wound. The electrode assembly 130 may be of stack type, folding type, stack-folding type, and jelly-roll type. The electrode plates of the electrode assembly 130 are formed by coating an active material slurry on a current collector, and the slurry may be generally prepared by stirring a particulate active material, an auxiliary conductive material, a binder and a plasticizer with the addition of a solvent. Also, each of the electrode plates may have a non-coating part which is not coated with the slurry, and the electrode tab 140 corresponding to each electrode plate may be formed at the non-coating part.

The positive electrode current collector is generally made with a thickness of 3 to 500 µm. The positive electrode current collector is not limited to a particular type if it has a high conductivity while not causing a chemical change in the corresponding battery, and includes, for example, stainless steel, aluminum, nickel, titanium, sintered carbon, or aluminum or stainless steel treated with carbon, nickel, titanium, or silver on the surface. The current collector may have a fine textured structure on the surface to enhance the bond strength of the positive electrode active material, and may be embodied in various forms such as films, sheets, foils, nets, porous structures, foams, and nonwovens.

The positive electrode active material includes a chalcogenide compound to allow intercalation/deintercalation of lithium ions, and for example, may be formed using composite metal oxides such as $LiCoO_2$, $LiMn_2O_4$, $LiNiO_2$, $LiNi_{1-x}Co_xO_2 (0<x<1)$, $LiMnO_2$.

The auxiliary conductive material is generally present in 1 to 50 wt % based on the total weight of the mixture including the positive electrode active material. The auxiliary conductive material is not particularly limited if it has conductivity while not causing a chemical change in the corresponding battery, and includes, for example, graphite such as natural graphite and artificial graphite; carbon black such as carbon black, acetylene black, Ketjen black, channel black, furnace black, lamp black, and thermal black; conductive fibers such as carbon fibers and metal fibers; metal powder such as fluoro carbon, aluminum, and nickel powder; conductive whisker such as zinc oxide and potassium titanate; conductive metal oxide such as titanium oxide; and conductive materials such as polyphenylene derivatives.

The binder is an ingredient which aids binding of the active material and the auxiliary conductive material and binding to the current collector, and is generally present in 1 to 50 wt % based on the total weight of the mixture including the positive electrode active material. Examples of the binder include polyvinylidene fluoride, polyvinylalcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene terpolymer (EPDM), sulfonated EPDM, styrene butyrene rubber, fluoro rubber, and various copolymers.

The separator is interposed between the positive electrode plate and the negative electrode plate to prevent a short that may occur between the positive electrode plate and the negative electrode plate, and only lithium ions are allowed to move by the separator. The separator may be formed of thermoplastic resin such as polyethylene (PE) or polypropylene (PP), and its surface may have a porous membrane structure.

The negative electrode current collector is generally made with a thickness of 3 to 500 μm. The negative electrode current collector is not limited to a particular type if it has conductivity while not causing a chemical change in the corresponding battery, and includes, for example, copper, stainless steel, aluminum, nickel, titanium, sintered carbon, or coper or stainless steel treated with carbon, nickel, titanium, or silver on the surface, and aluminum-cadmium alloys. Also, in the same way as the positive electrode current collector, the negative electrode current collector may have a fine textured structure on the surface to enhance the bond strength of the negative electrode active material, and may be embodied in various forms such as films, sheets, foils, nets, porous structures, foams, and nonwovens.

The negative electrode active material may be formed of a material such as carbon (C)-based materials, silicon (Si), tin (Sn), tin oxide, tin alloy composite, transition metal oxide, lithium metal nitride or lithium metal oxide to allow intercalation/deintercalation of lithium ions. For example, carbon such as non-graphitizable carbon and graphite-based carbon; metal composite oxide such as $Li_xFe_2O_3$ ($0 \le x \le 1$), $Li_xWO_2$ ($0 \le x \le 1$), $Sn_xMe_{1-x}Me'_yO_z$ (Me:Mn, Fe, Pb, Ge; Me': Al, B, P, Si, elements in Groups 1, 2, and 3 of the periodic table, halogen; $0 < x \le 1$; $1 \le y \le 3$; $1 \le z \le 8$); lithium metals; lithium alloys; silicon-based alloys; tin-based alloys; metal oxides such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, and $Bi_2O_5$; conductive polymers such as polyacetylene; and Li—Co—Ni based materials.

The electrode tab 140 includes a positive electrode tab (for example, an electrode tab shown on the left side of FIG. 3) and a negative electrode tab (for example, an electrode tab shown on the right side of FIG. 3), and each is formed to jut out of the electrode assembly 130. That is, positive electrode tab is formed to jut out of the positive electrode plate of the electrode assembly 130, and the negative electrode tab is formed to jut out of the negative electrode plate of the electrode assembly 130. In this instance, the positive electrode tab or the negative electrode tab may be formed to jut outside such that the positive electrode tab or the negative electrode tab is attached to the positive electrode plate or the negative electrode plate, and each may be formed of the same material as the positive electrode current collector or the negative electrode current collector.

A plurality of the electrode tabs 140 may be provided for one electrode plate. For example, the positive electrode plate may be provided with a plurality of positive electrode tabs, and the negative electrode plate may be provided with a plurality of negative electrode tabs. In this case, a plurality of positive electrode tabs may be connected to one positive electrode lead, and a plurality of negative electrode tabs may be connected to one negative electrode lead. However, the present disclosure is not necessarily limited to this embodiment, and one positive electrode tab and one negative electrode tab may be provided for one electrode assembly 130.

On the other hand, although FIG. 3 shows that two types of electrode tabs 140, namely, the positive electrode tab and the negative electrode tab jut in opposite directions (two direction battery), the present disclosure is not limited to this shape. For example, the positive electrode tab and the negative electrode tab may be formed to jut in the same direction (one direction battery) or orthogonal direction with respect to the electrode assembly 130.

The electrode lead 150 is a thin plate-shaped metal, with one end attached to the electrode tab 140 and the other end, i.e., the opposite end exposed outside of the pouch case 120. The electrode lead 150 is arranged extending parallel to the surface-wise direction of the secondary battery 100 and has no bent part. The electrode lead 150 may include metal having good electrical conductivity. For example, the electrode lead 150 may include at least one of aluminum, copper, nickel and SUS. However, the present disclosure is not limited to a particular type of the electrode lead 150, and a variety of materials that can be used for electrode lead materials may be employed by the present disclosure. Preferably, the electrode lead 150 may be formed of the same material as the electrode plate or the electrode tab 140 to which the electrode lead 150 is attached. For example, in the case of the positive electrode lead attached to the positive electrode plate made primarily of aluminum, the electrode lead 150 may primarily include aluminum. Also, in the case of the negative electrode lead attached to the negative electrode plate made primarily of copper, the electrode lead 150 may primarily include copper.

The lead film 160 may be interposed between the other end of the electrode lead 150 and the pouch case 120. The lead film 160 can prevent a short from occurring between the electrode lead 150 and the metal layer of the pouch case 120, and improve sealability of the pouch case 120. When joining the electrode lead 150 and the electrode tab 140 made of metal to the pouch case 120 made of polymer using heat fusion, the strength of surface adhesion may reduce due to somewhat large contact resistance. However, as in the embodiment, if the lead film 160 is provided, an adhesion strength reduction phenomenon can be prevented. Also, the lead film 160 is preferably made of an insulating material to block the application of electric current from the electrode lead 150 and the electrode tab 140 to the pouch case 120. The lead film 160 is formed of a film having insulating and heat fusion properties. The lead film 160 may be formed of, for example, at least one material layer (single membrane or multiple membrane) selected from polyimide, (PI), polypropylene, polyethylene and polyethylene terephthalate (PET).

The pouch case 120 has a concave internal space, and the electrode assembly 130 and an electrolyte solution are received in the internal space. In this embodiment, the pouch case 120 may be formed in the shape of an aluminum pouch having an aluminum thin film interposed between an insulating layer and an adhesive layer made of polymer. The insulating layer made of polymer may act as a substrate and a protective layer, and may primarily protect the electrode assembly 130 received inside from external shocks. The insulating layer made of polymer may be formed of nylon, or resin such as polyethyleneterephthalate, but is not limited thereto. The aluminum thin film may act as a substrate to maintain the mechanical strength and a barrier layer to prevent the penetration of moisture and oxygen. The adhesive layer is also referred to as a heat fusion layer, and may act as a sealing agent due to having heat adhesion properties. The adhesive layer may be formed of a polyolefin-based resin material. For the polyolefin-based resin layer, casted polypropylene (CPP) is commonly used. Also, the adhesive layer may be formed of polyolefin-based resin, for example, a material selected from the group consisting of copolymers of polypropylene chloride, polyethylene and ethylenepropylene, copolymers of polyethylene and acrylic acid, and copolymers of polypropylene and acrylic acid, but is not limited thereto. Preferably, the overall thickness of the pouch is generally 40~120 m, the insulating layer and the adhesive layer 10~40 μm, the aluminum thin film 20~100 μm, but is not limited thereto.

In this instance, the pouch case 120 may include an upper case and a lower case. Also, a space in which the electrode assembly 130 can be received may be formed in any one of the upper case and the lower case, or both the upper case and the lower case. On the other hand, when the electrode assembly 130 is received in the receiving space of the upper case or the lower case and an electrolyte solution is injected, the sealing part adhesive layer of the upper case and the sealing part adhesive layer of the lower case may be adhered by heat fusion.

The electrolyte solution may include a nonaqueous electrolyte solution and a lithium salt. For example, the nonaqueous electrolyte solution includes an aprotic organic solvent such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydroxy franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

The lithium salt is a material which dissolves well in the nonaqueous electrolyte solution, and for example, includes LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF6, LiAlCl$_4$, CH$_3$SO$_3$Li, CF$_3$SO$_3$Li, (CF$_3$SO$_2$)$_2$NLi, lithium chloroborate, lower aliphatic lithium carbonate, lithium tetraphenylborate, and imide. Also, to improve the charging/discharging characteristics and flame retardancy, for example, pyridine, triethylphosphite, triethanol amine, cyclic ether, ethylene diamine, n-glyme, hexamethyl phosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, and trichloro aluminum may be added to the nonaqueous electrolyte solution. According to circumstances, to impart non-flammable properties, a halogen containing solvent such as carbon tetrachloride and trifluoroethylene may be further included, and to improve high temperature storage characteristics, carbon dioxide gas may be further included.

The welded part B is formed by welding one end of the electrode tab 140 to the side surface of the electrode lead 150. Because the electrode tab 140 is not bent and its end part is welded to the side surface of the electrode lead 150, this welding is a line contact when viewed from the side surface of the electrode lead 150, and forms a point contact with each electrode tab 140 along the thickness-wise direction. When the plurality of electrode tabs 140 is joined together to the side surface of the electrode lead 150 by welding to form the welded part B, the thickness of the electrode lead 150 is thicker than the sum of thicknesses of the plurality of electrode tabs 140. When the thickness of the electrode lead 150 is larger than conventional thickness for thickness-wise direction welding, the cooling performance is improved.

If the conventional welded part A is surface-wise direction welding, the welded part B of the embodiment of the present disclosure is thickness-wise direction welding. Also, it can be said that if the conventional welded part A is a surface contact, the welded part B of the embodiment of the present disclosure is a point contact or a line contact. While the conventional welded part A is about 4 mm wide in the length-wise direction width, the length-wise direction width may be reduced less than 1 mm according to the present disclosure. As described above, the present disclosure can reduce the non-electrode region and increase the size of the electrode assembly 130 through the welded part B having a smaller welding width in the surface-wise direction than the conventional welded part A, thereby maximizing the spatial utility. Accordingly, battery capacity increases can be achieved.

Figure 4:
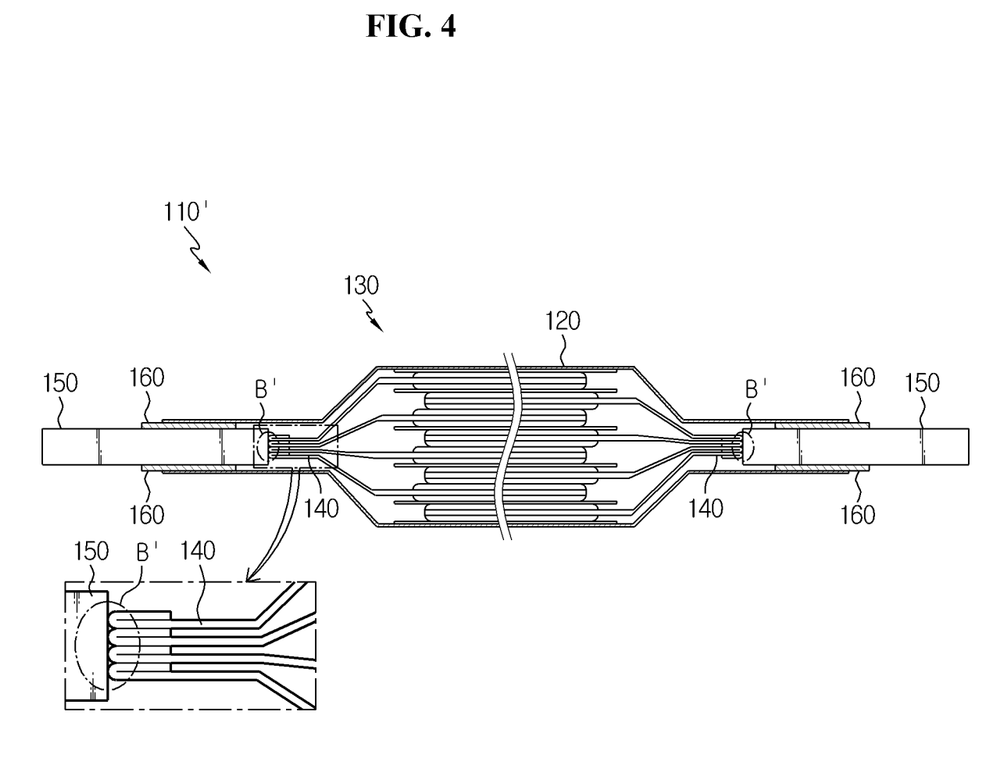
FIG. 4 is a cross-sectional view of a pouch-type secondary battery according to another embodiment of the present disclosure.

FIG. 4 is a cross-sectional view of a pouch-type secondary battery according to another embodiment of the present disclosure.

The secondary battery 110' of FIG. 4 is similar to the secondary battery 110 of FIG. 3, and particularly, there is a difference in that one end part of the electrode tab 140 is bent 180 degrees and folded in dual layers, increasing the thickness, and the bent part is welded to the side surface of the electrode lead 150 to form a welded part B'. Here, the bending direction is the extending direction of the electrode tab 140, namely, 180 degrees with respect to the surface-wise direction of the secondary battery 110, and the bent part comes into point or line contact with the side surface of the electrode lead 150.

Figure 5:
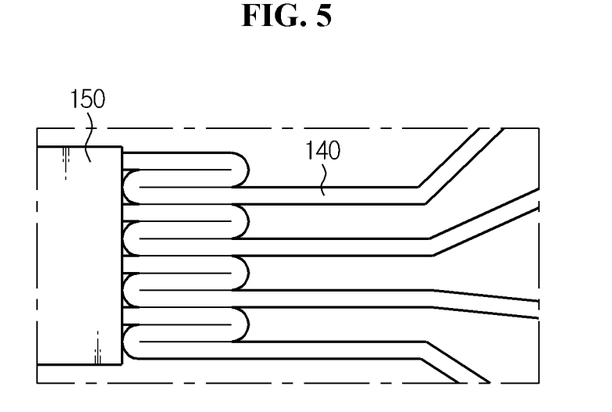
FIG. 5 shows a variation example of the pouch-type secondary battery shown in FIG. 4.

On the other hand, although FIG. 4 illustrates and describes the case in which the electrode tab 140 is bent once in the shape of letter U, the number of bendings may be one or more, if necessary, and in such a case, an effect is that a wider welding area can be provided. For example, as shown in FIG. 5, the electrode tab 140 may be bent twice in the shape of letter S and welded. To form the shape of letter S, if bending in the shape of letter U is performed once more after bending in the shape of letter U, bending is performed twice, so a tensile force occurs by bending on one side while a compressive force is applied by bending on the other side. As a result, stress occurring at the joined part is offset.

Figure 6:
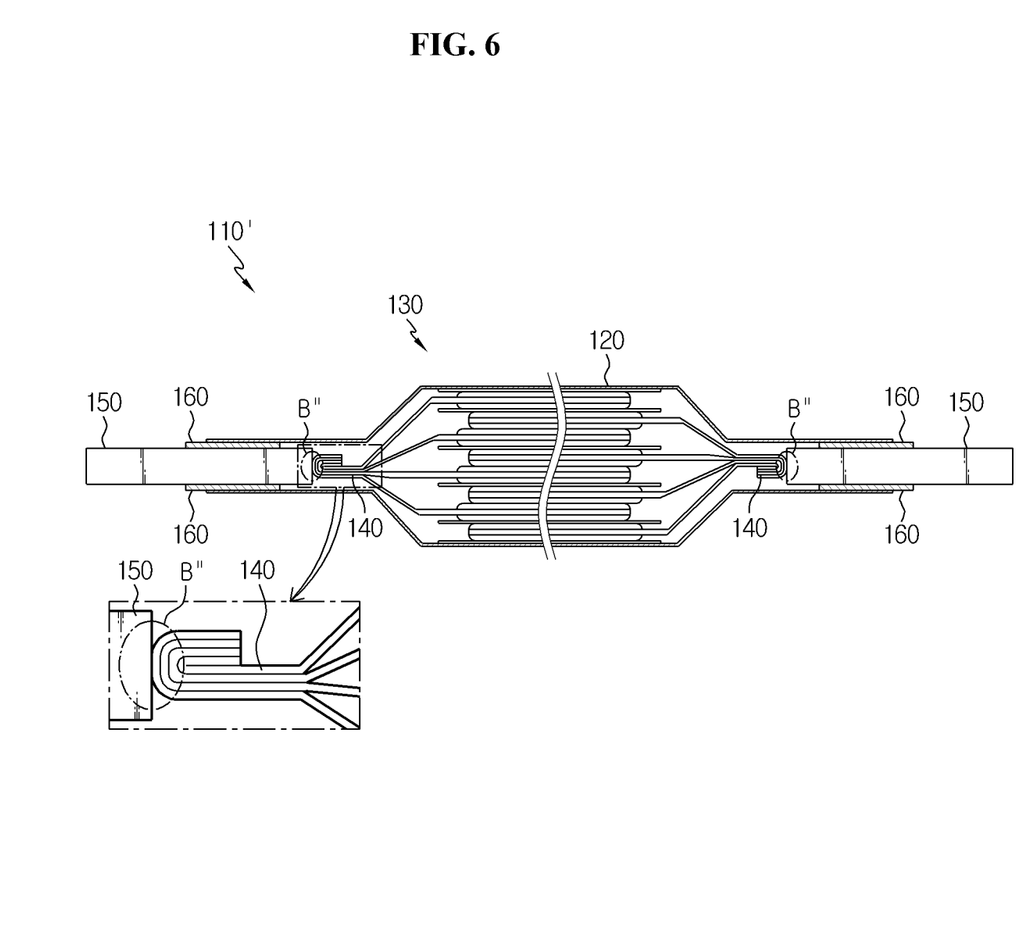
FIG. 6 is a cross-sectional view of a pouch-type secondary battery according to still another embodiment of the present disclosure.

Although each electrode tab 140 is bent one by one to form the welded part B' as shown in this embodiment, the plurality of electrode tabs 140 may be bent together at the same time to form a welded part B" as shown in FIG. 6. The secondary battery 110" of FIG. 6 is only different from the secondary battery 110' of FIG. 4 in the respect of the welded part B".

The electrode tab 140 itself is as thin as a few μm to a few mm similar to the electrode plate, and when the thickness increases by bending and folding as shown in FIGS. 4 through 6, the welding area increases and the strength of the welded part increases. In this instance, it is preferable to prevent stress from concentrating on the bent part of the thin electrode tab 140. In the present disclosure, because the bent part is welded, stress concentration on the bent part can be prevented.

On the other hand, although FIG. 6 illustrates and describes the case in which the electrode tab 140 is bent once in the shape of letter U, the number of bendings may be one or more, if necessary.

Further, although the plurality of electrode tabs 140 bent and welded together in the same direction is taken as an example in FIG. 6, an example in which the electrode tabs 140 are divided into a plurality of groups and bent for each group, and the bent parts are welded together to the side surface of the electrode lead 150 is possible. In this instance, the bending direction of the plurality of groups may be identical or opposite to each other.

Figure 7:
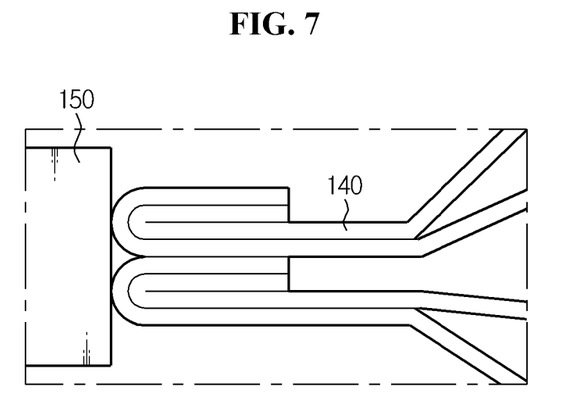
FIG. 7 shows a variation example of the pouch-type secondary battery shown in FIG. 6.

For example, as shown in FIG. 7, the electrode tabs 140 are divided into two groups, a relatively upper group is bent from the left side to the upper right side as shown, and a relatively lower group is bent from the left side to the upper right side in the same way, and two groups are welded parallel to each other.

Figure 8:
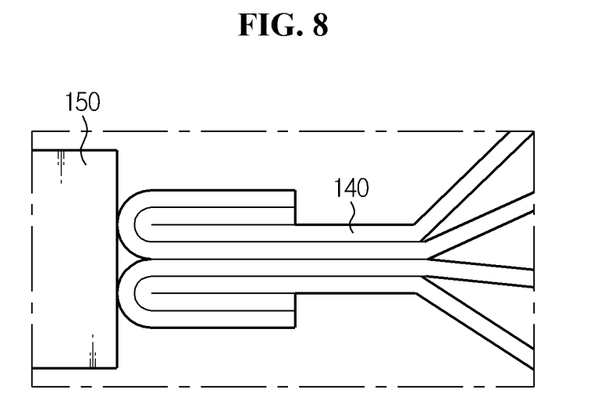
FIG. 8 shows another variation example of the pouch-type secondary battery shown in FIG. 6.

As another example, as shown in FIG. 8, the electrode tabs 140 are divided into two groups, a relatively upper group is bent from the left side to the upper right side as shown, and to the contrary, a relatively lower group is bent from the left side to the lower right side, and two groups are welded in mirror symmetry.

In the secondary batteries 110, 110', 110" according to the embodiment of the present disclosure described with reference to FIGS. 3, 4 and 6, each welded part B, B', B" may be formed with a width of 1 mm or less in the length-wise direction of the electrode lead 150, i.e., the surface-wise direction of the secondary battery. Because each welded part B, B', B" is formed by welding the end part of the electrode tab 140 or the bent part bent at 180 degrees to the side surface of the electrode lead 150, the electrode lead 150 and the electrode tab 140 are joined by a point contact or a line contact.

In the case of the embodiments according to the present disclosure, because the width of the space for coupling between the electrode tab 140 and the electrode lead 150 is reduced compared to the conventional art, the space for coupling of the electrode tab 140 and the electrode lead 150 occupies a smaller volume of the pouch case 120 than the conventional art. As the welding width reduces, the size of the electrode assembly 13 can increase as much. Thus, according to the embodiments of the present disclosure, an advantage is that the spatial utility of the pouch-type secondary battery can increase as compared to the conventional art.

Figure 9:
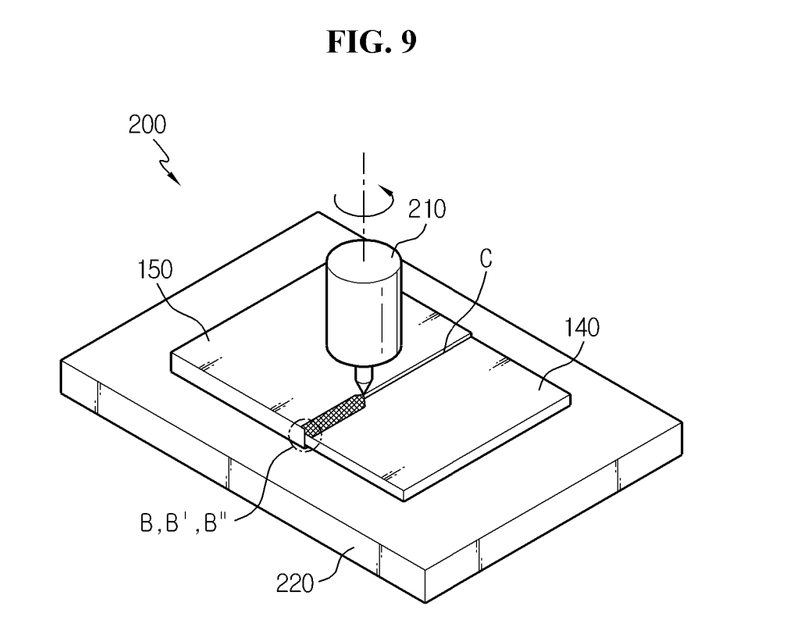
FIG. 9 is an outline diagram illustrating a welding method of an electrode tab and an electrode lead in a pouch-type secondary battery according to the present disclosure.

Each welded part B, B', B" may be formed by performing welding by friction stir welding. FIG. 9 is a diagram showing the basic principle of friction stir welding.

Referring to FIG. 9, a friction stir welding device 200 includes a tool 210 for friction stir welding which is inserted into an object to be welded, in the present disclosure, the electrode tab 140 and the electrode lead 150, and rotates to enable joining by friction and stirring action. When the object to be welded is mounted on a support 220, and a pin moves forward in the welding proceeding direction along a joining surface C from the location at which the pin is inserted into the object to be welded by the rotating tool 210, joining is accomplished by the friction and stirring action of the tool 210 and the pin. The tool 210 is made of a material having good heat resistance, for example, including aluminum alloys, copper, titanium, or stainless steel. It is a welding method which presses the tool 210 on the object to be welded, moves the tool 210 along the joining surface C while rotating the tool 210, so that the two materials are heated, softened, and melt and flow by heat generated by friction heat and stirring of the tool 210, to form a solid phase joint, for example, the two materials are welded together at a joining area.

When the tool 210 is lifted down while a spindle of the tool 210 rotates at a preset speed at the same time with the start of friction stir welding, a shoulder part of the tool 210 applies pressure to the surface of the object to be welded while the pin provided below the tool 210 heats and stirs the electrode tab 140 and the electrode lead 150, to form the welded part B, B', B". For example, the tool 210 may rotate at 1000 to 2500 rpm and move along a member which is welded at the speed of 1.0 to 8.0 mm/s. Because friction stir welding accomplishes joining in solid state of the electrode tab 140 and the electrode lead 150 in which the electrode tab 140 and the electrode lead 150 do not melt, an advantage is that the characteristics of the welded part B, B', B" are better than melting welding.

When the precision of the joining surface C of the electrode tab 140 and the electrode lead 150 is high, good welded parts B, B', B" can be obtained. To this end, to obtain good welded parts B, B', B", the joining surface C of the electrode tab 140 and the electrode lead 150 may undergo precise surface processing before welding.

Figure 10:
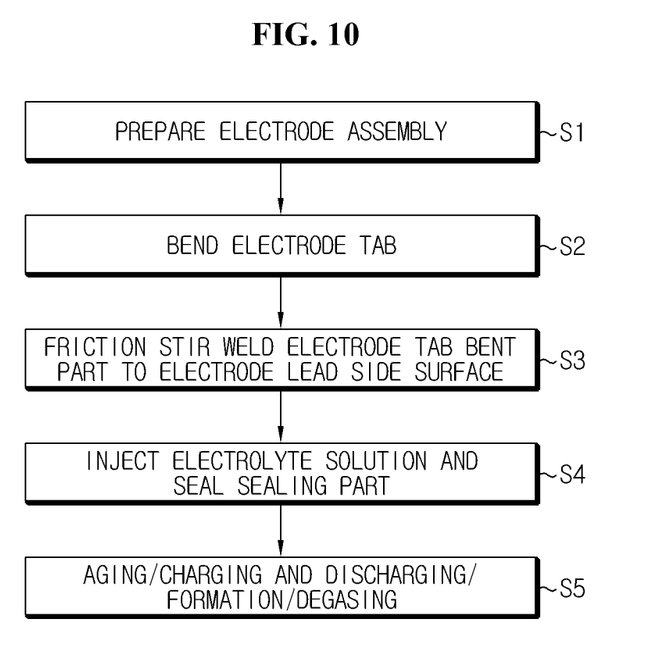
FIG. 10 is a flowchart of a method for fabricating a pouch-type secondary battery according to the present disclosure.

Hereinafter, referring to FIG. 10, a method for fabricating a pouch-type secondary battery according to a preferred embodiment of the present disclosure is described in brief.

First, the electrode assembly 130 with the electrode plate having the electrode tab 140 connected thereto is prepared (S1).

Subsequently, one end part of the electrode tab 140 is bent once or more to increase the thickness (S2). An example of bending has been described with reference to FIGS. 4 through 8.

Subsequently, the bent part of the electrode tab 140 is joined to the side surface of the electrode lead 150 by friction stir welding (S3). The friction stir welding follows the method described with reference to FIG. 9.

Subsequently, the electrode assembly 130 is received in the pouch case 120 such that the other end of the electrode lead 150 is exposed outside of the pouch case 120, an electrolyte solution is injected into the pouch case 120, and heat fusion is performed on a sealing part of the pouch case 120 (S4). According to circumstances, a method may be used in which heat fusion is first performed to seal the parts other than an electrolyte solution injection part, and then an electrolyte solution is injected and the electrolyte solution injection part is sealed.

Subsequently, a subsequent process of the secondary battery, such as aging, charging/discharging, formation and degasing is performed (S5).

While the present disclosure has been hereinabove described with respect to a limited number of embodiments and drawings, the present disclosure is not limited thereto and it should be understood that various modifications and changes can be made by those skilled in the art within the scope of the technical aspects of the present disclosure and the appended claims and their equivalents.

On the other hand, although the terms indicating the directions such as up and down have been used herein, these terms are only for convenience of description, and it is obvious to those skilled in the art that the terms may be changed depending on the position of target objects or observers.

What is claimed is:

1. A secondary battery, having a sealed structure such that an electrode assembly of positive electrode plate/separator/negative electrode plate is embedded in a pouch case and an electrode tab of the electrode assembly is joined to an electrode lead and juts outside,
wherein the electrode tab is welded to a side surface perpendicular to a surface-wise direction of the secondary battery on the electrode lead arranged parallel to the surface-wise direction of the secondary battery, to form a welded part in a thickness-wise direction of the electrode lead between the electrode lead and the electrode tab,
wherein the secondary battery has an overall length, an overall width, and an overall thickness extending in the thickness-wise direction, and
wherein the overall thickness is less than each of the overall length and overall width.

2. The secondary battery according to claim 1, wherein the welded part is formed by welding one end of the electrode tab to the side surface of the electrode lead.

3. The secondary battery according to claim 1, wherein the electrode tab is multiple in number, the multiple electrode tabs are joined together to the side surface of the electrode lead by welding to form the welded part, and a thickness of the electrode lead is thicker than the sum of thicknesses of the multiple electrode tabs.

4. The secondary battery according to claim 1, wherein one end part of the electrode tab is bent 180 degrees and folded in dual layers to increase the thickness, and a bent part is welded to the side surface of the electrode lead to form the welded part.

5. The secondary battery according to claim 4, wherein the electrode tab is multiple in number and the multiple electrode tabs are bent together.

6. The secondary battery according to claim 4, wherein the electrode tab is multiple in number and the electrode tabs are individually bent.

7. The secondary battery according to claim 6, wherein the electrode tabs are stacked in the thickness-wise direction.

8. The secondary battery according to claim 1, wherein the welded part has a width in a length-wise direction of the electrode lead that is less than or equal to 1 mm.

9. A method for fabricating a secondary battery, the secondary battery having a sealed structure such that an electrode assembly of positive electrode plate/separator/negative electrode plate is embedded in a pouch case and an electrode tab of the electrode assembly is joined to an electrode lead and juts outside, the method comprising:
welding the electrode tab to a side surface perpendicular to a surface-wise direction of the secondary battery on the electrode lead arranged parallel to the surface-wise direction of the secondary battery, to form a welded part in a thickness-wise direction of the electrode lead between the electrode lead and the electrode tab,
wherein the secondary battery has an overall length, an overall width, and an overall thickness extending in the thickness-wise direction, and
wherein the overall thickness is less than each of the overall length and overall width.

10. The method for fabricating a secondary battery according to claim 9, wherein the welded part is formed by welding one end of the electrode tab to the side surface of the electrode lead.

11. The method for fabricating a secondary battery according to claim 9, wherein the electrode tab is multiple in number, the multiple electrode tabs are joined together to the side surface of the electrode lead by welding to form the welded part, and a thickness of the electrode lead is thicker than the sum of thicknesses of the multiple electrode tabs.

12. The method for fabricating a secondary battery according to claim 9, wherein one end part of the electrode tab is bent 180 degrees and folded in dual layers to increase the thickness, and a bent part is welded to the side surface of the electrode lead to form the welded part.

13. The method for fabricating a secondary battery according to claim 12, wherein the electrode tab is multiple in number and the multiple electrode tabs are bent together.

14. The method for fabricating a secondary battery according to claim 12, wherein the electrode tab is multiple in number and the electrode tabs are individually bent.

15. The method for fabricating a secondary battery according to claim 14, wherein the electrode tabs are stacked in the thickness-wise direction.

16. The method for fabricating a secondary battery according to claim 9, wherein the welding is performed by friction stir welding.

* * * * *